(12) United States Patent
Ergun et al.

(10) Patent No.: US 11,886,454 B2
(45) Date of Patent: Jan. 30, 2024

(54) SYSTEMS AND METHODS FOR STORING AND ACCESSING DATABASE QUERIES

(71) Applicant: Capital One Services, LLC, McLean, VA (US)

(72) Inventors: Caglar Ergun, Plano, TX (US); Mahesh Senniappan, Plano, TX (US); Junbo Chen, Irving, TX (US); David Schaaf, McKinney, TX (US); Mahadevan Sivaramakrishnan, Allen, TX (US)

(73) Assignee: Capital One Services, LLC, McLean, VA (US)

( * ) Notice: Subject to any disclaimer, the term of this patent is extended or adjusted under 35 U.S.C. 154(b) by 56 days.

(21) Appl. No.: 15/880,238

(22) Filed: Jan. 25, 2018

(65) Prior Publication Data

US 2019/0228095 A1 Jul. 25, 2019

(51) Int. Cl.
*G06F 16/248* (2019.01)
*G06F 16/242* (2019.01)
(Continued)

(52) U.S. Cl.
CPC .......... *G06F 16/248* (2019.01); *G06F 16/242* (2019.01); *G06F 16/2455* (2019.01); *G06F 16/951* (2019.01)

(58) Field of Classification Search
CPC .. G06F 16/248; G06F 16/242; G06F 16/2455; G06F 16/951; G06F 16/243;
(Continued)

(56) References Cited

U.S. PATENT DOCUMENTS 6,775,665 B1 * 8/2004 Piersol .............. G06F 17/30017
2005/0171934 A1 * 8/2005 Yuknewicz ......... G06F 16/2428
(Continued)

OTHER PUBLICATIONS

Nodine, Marian, William Bohrer, and A. Hee Hiong Ngu. "Semantic brokering over dynamic heterogeneous data sources in InfoSleuth/sup TM." Proceedings 15th International Conference on Data Engineering (Cat. No. 99CB36337). IEEE, 1999. (Year: 1999).*
(Continued)

*Primary Examiner* — Mohsen Almani
(74) *Attorney, Agent, or Firm* — Perkins Coie LLP

(57) ABSTRACT

Systems and methods are provided for managing structured data queries. A disclosed method includes operations for: receiving, via a user interface, a request for querying a structured database system, the request including a non-structured search term associated with the request; identifying, in a database storing a plurality of structured data queries, a data query associated with the search term; returning, responsive to the request, information associated with the identified data query, the information including selective parameters of the identified data query, the selective parameters being displayable and modifiable by a user via the user interface; receiving, via the user interface, configuration information associated with at least one of the selective parameters; configuring an executable data query based on the identified data query and the received configuration information; and providing, via the user interface, data returned from the database system responsive to execution of the executable data query.

20 Claims, 7 Drawing Sheets

(51) Int. Cl.
*G06F 16/2455* (2019.01)
*G06F 16/951* (2019.01)

(58) Field of Classification Search
CPC ............. G06F 16/2433; G06F 16/2435; G06F 16/2438; G06F 16/244; G06F 16/2443; G06F 16/2445; G06F 16/2448; G06F 16/24522; G06F 16/24524; G06F 16/24526; G06F 16/24528
USPC ........................................................ 707/722
See application file for complete search history.

(56) References Cited

U.S. PATENT DOCUMENTS

| | | | | |
|---|---|---|---|---|
| 2006/0004708 | A1* | 1/2006 | Hartmann | G06F 16/951 |
| 2006/0294066 | A1* | 12/2006 | Dettinger | G06F 17/30551 |
| 2007/0208722 | A1* | 9/2007 | Dettinger | G06F 16/3322 |
| 2017/0242885 | A1* | 8/2017 | Svonja | G06F 16/242 |
| 2018/0032576 | A1* | 2/2018 | Romero | G06F 16/24522 |

OTHER PUBLICATIONS

Khoussainova, Nodira, et al. "A case for a collaborative query management system." arXiv preprint arXiv:0909.1778 (2009). (Year: 2009).*

* cited by examiner

SYSTEMS AND METHODS FOR STORING AND ACCESSING DATABASE QUERIES

TECHNICAL FIELD

This disclosure generally relates to big data analytics, and more particularly, to improving access to data by managing database queries.

BACKGROUND

Most companies rely on both trained analysts and non-analysts to analyze and interpret data stored in large databases. Often, a non-analyst must request an analyst to pull specific data from the database when the non-analyst does not have the skill set to execute a particular database query. This creates inefficiency as a bottleneck is created when non-analysts must rely on analysts to pull data. Further, even trained analysts often must write and rewrite several queries to pull similar data from a database as prior queries thereby resulting in reduced efficiency and redundant work. Additionally, unless a set of queries are identical the returned dataset is likely to include inconsistent or incomplete data, thus preventing generation of reliable reports and adding validation delays for resolving inconsistencies. As a result of these bottlenecks and inefficiencies, long lead times and backlogs are created for assembling and modifying data reports pulled from increasingly large sources of data.

Existing data systems lack capabilities for facilitating consistent data queries in an enterprise by trained analysts and non-analysts alike. Some currently available systems, for example, allow for the storage of previously configured queries in a central repository. However, these systems require a knowledge of databases and query language and are therefore unusable by an untrained employee. For example, a person unskilled in a query language may not have the ability to navigate the interfaces of a database system or to understand and execute queries. This prevents many non-analyst requesters from being able to efficiently pull data from an enterprise's data systems. Thus, technical improvements are needed in existing data systems to facilitate generation of queries for pulling consistent data across an enterprise and to make those queries accessible to those without technical knowledge.

SUMMARY

The disclosed embodiments address the current need for a query database accessible by both analysts and non-analysts. The disclosed embodiments include a query broker that resolves user inputs into consistent queries for an underlying data platform that is accessible across an enterprise network thereby reducing some of the inefficiencies in existing system. To provide these improvements, the query broker allows non-analysts, or those without specialized training in database queries, to generate and run queries without additional assistance from an analyst, programming, or other database expert.

The disclosed embodiments include a system for managing data queries. The system includes a memory storing instructions and one or more processors configured to execute the instructions to perform operations including: receive, via a user interface, a request for querying a structured database system, the request including a non-structured search term associated with the request; identify, in a database storing a plurality of structured data queries, a data query associated with the search term; return, responsive to the request, information associated with the identified data query, the information including selective parameters of the identified data query, the selective parameters being displayable and modifiable by a user via the user interface; receive, via the user interface, configuration information associated with at least one of the selective parameters; configure an executable data query based on the identified data query and the received configuration information; and provide, via the user interface, data returned from the database system responsive to execution of the executable data query.

Another disclosed embodiment may include a system for providing a managed structured data query to a non-analyst user. The system includes a memory storing instructions, and one or more processors configured to execute the instructions to perform operations including: provide, via a user interface, a first input window for receiving a non-analyst request for querying a structured database system, the request including a non-structured search term associated with the request; identify, in a database storing a plurality of structured data queries, a data query associated with the search term; provide, in response to the request, information associated with the identified data query, the information including selective parameters of the identified data query, the selective parameters being displayable and modifiable by the non-analyst via the user interface; provide, via the user interface, a second input window for receiving configuration information associated with at least one of the selective parameters; configure an executable data query based on the identified data query and the received configuration information; and provide, via the user interface, data returned from the database system responsive to execution of the executable data query.

Another disclosed embodiment may include a method for managing data queries, including: receiving, via a user interface, a request for querying a structured database system, the request including a non-structured search term associated with the request; identifying, in a database storing a plurality of structured data queries, a data query associated with the search term; returning, responsive to the request, information associated with the identified data query, the information including selective parameters of the identified data query, the selective parameters being displayable and modifiable by a user via the user interface; receiving, via the user interface, configuration information associated with at least one of the selective parameters; configuring an executable data query based on the identified data query and the received configuration information; and providing, via the user interface, data returned from the database system responsive to execution of the executable data query.

Consistent with additional embodiments of the present disclosure, a computer-readable medium is disclosed that stores instructions that, when executed by a processor(s), causes the processor(s) to perform operations consistent with one or more disclosed methods.

It is to be understood that both the foregoing general description and the following detailed description are by example and explanatory only, and are not restrictive of the disclosed embodiments as claimed.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DESCRIPTION OF THE EMBODIMENTS

Figure 1:
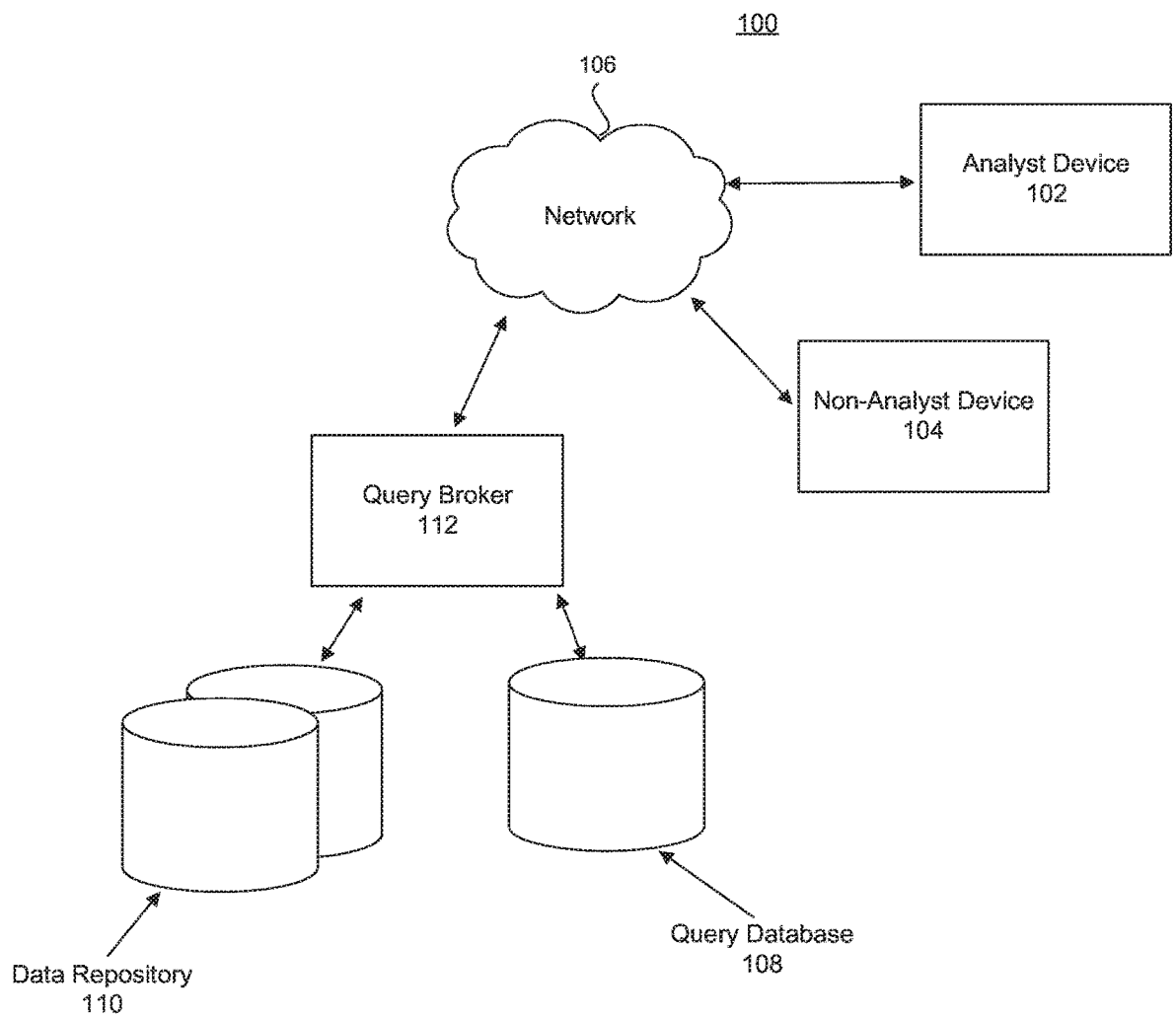
FIG. 1 is a block diagram of an example system environment including a query database, consistent with disclosed embodiments.

Generally, the disclosed embodiments are directed to systems and techniques for improving access to data based on managed database queries. For example, some embodiments implement a query database for storing structured database queries for accessing data of a database system, and a query broker for allowing a user to search for, configure, modify, and execute the queries stored in the query database. In some embodiments, the query broker enables users not trained in database technology to more efficiently and effectively pull queried data from an enterprise database system without having to understand a query language.

A query may include an instruction or set of instructions (e.g., a script) that allows a user to request desired data, and allows a database management system (DBMS) to plan, optimize, and perform the operations necessary to produce the result desired by the user. In some embodiments, the instruction may be written according to Structured Query Language (SQL) or another programming language for accessing or managing data of a database system.

In the disclosed embodiments, a query broker may include capabilities for resolving user inputs into queries for an underlying data platform that is accessible across an enterprise network. The queries may be generated or selected from a query database to produce consistent data pulls from a database system, thereby reducing some of the inefficiencies in existing systems. A query broker may allow non-analysts, or those without specialized training in database queries, to configure, generate and run queries without additional assistance from an analyst, or programming or other database expert.

By allowing non-analysts to search for, create, and execute queries, the system reduces time needed for a non-analyst to complete data-related tasks. For example, a non-analyst may wish to acquire data for a year-end report. In this example, normally the non-analyst would request the necessary data from an analyst who is able to generate a SQL query and execute the query in an appropriate database. In this situation a delay is created for the non-analyst who must wait for the analyst to execute the query and a backlog is created for the analyst receiving multiple requests for data from non-analysts. The disclosed embodiments, however, enable a non-analyst to search a query database for a relevant query, change or configure a parameter (e.g., date range), and execute the query without having a knowledge of database languages or the structure of the database system. Thus, the disclosed embodiments are capable of reducing the number of requests that are directed to a trained analyst, and because the queries available to the non-analyst are preconfigured or selectively configurable this allows non-trained analysts to generate consistent and reliable data reports.

Reference will now be made in detail to example embodiments, examples of which are illustrated in the accompanying drawings and disclosed herein. Wherever convenient, the same reference numbers will be used throughout the drawings to refer to the same or like parts. For ease of discussion, the present disclosure may describe embodiments in the context of a financial service provider using a DBMS to store, analyze, and access data. It is to be understood, however, that disclosed embodiments are not limited to this context. Rather, the disclosed systems, methods, and techniques implementing a query database and query broker may apply to any type of database or database system, and are not limited to the financial services industry.

FIG. 1 is a schematic diagram illustrating an example system environment, consistent with disclosed embodiments. An example system 100, as shown in FIG. 1, may include one or more of an analyst device 102, a non-analyst device 104, a query database 108, one or more data repositories 110, and a query broker 112, each of which may be interconnected via one or more networks 106. The components and arrangements shown in FIG. 1 are by example and are not intended to limit the disclosed embodiments, as the components used to implement the disclosed processes may vary.

Analyst device 102 includes any computing device from which an analyst may run a query for data included in data repository 110. As referenced herein, the term "analyst" refers to someone with a technical knowledge of databases, database languages, and/or database architecture. For example, an analyst may be a data architect, software developer, or information technology specialist. Analyst device 102 may be implemented or displayed using a variety of different equipment, such as supercomputers, personal computers, servers, mainframes, mobile devices, smartphones, tablets, etc. In some embodiments, analyst device 102 may be configured to receive input from an analyst, such as an executable SQL query. Analyst device 102 may include capabilities to receive other inputs from an analyst such as comments on stored queries and other related parameters or data consistent with the disclosed embodiments. In some embodiments, an analyst user may, via an interface displayed on the analyst device 102, for example, be able to add, update, and save a created query to the query database 108, as well as other tags or identifying information that may allow the created query to be categorized or searchable according to the disclosed embodiments.

Non-analyst device 104 includes any computing device from which a non-analyst may run a query for data included in data repository 110. As referenced herein, the term "non-analyst" refers to a person without a technical knowledge of databases, database languages, and/or database architecture. For example, a non-analyst may be a business professional or consultant. Non-analyst device 104 may be implemented or displayed using a variety of different equipment, such as supercomputers, personal computers, servers, mainframes, mobile devices, smartphones, tablets, etc. In some embodiments, non-analyst device 104 may be configured to receive input from an analyst or non-analyst and return results. Non-analyst device 104 may generally be distinguished from analyst device 102 based on the permissions or functionality enabled for a user of the device. For example, a non-analyst device 104 may have different database permissions from an analyst device 102. In some embodiments, a user associated with an analyst device 102 may create and store a query whereas a user associated with a non-analyst device 104 may be permitted to run that query and make modifications to or configure selective parameters of that query. In some embodiments, non-analyst device 104 may have the same permissions and capabilities as analyst device 102. While the non-analyst device 104 and non-analyst functionality of the system 100 will be described through-out in reference to a non-analyst user, all or some of the non-analyst functionality may also be accessible to an analyst user.

Network 106, in some embodiments, may include one or more interconnected wired, wireless, or cellular data networks that receive data, (e.g., a query) from one service or device (e.g., analyst device 102) and use it to access data stored in one or more databases (e.g. data repositories 110). For example, network 106 may be implemented as the Internet, a wired Wide Area Network (WAN), a wired Local Area Network (LAN), a wireless LAN (e.g., IEEE 802.11, Bluetooth, etc.), a wireless WAN (e.g., WiMAX), and the like. Each component in system 100 may communicate bidirectionally with other system 100 components either through network 106 or through one or more direct communication links (not shown).

Consistent with the disclosed embodiments, query database 108 may be configured to store queries and related metadata (e.g., tags and/or comments) produced or updated by analysts and/or non-analysts. Queries in the query database 108 may be stored according to an index or partition, for example, or other techniques for which the queries may be searchable. In some embodiments, for example, query database 108 may receive or obtain one or more queries and related metadata via network 106 from analyst device 102. By way of example, query database 108 may store a plurality of SQL queries to be executed in one or more databases contained in data repository 110. In some embodiments, query database 108 may be provided as part of data repository 110.

In some embodiments, one or more structured queries stored or accessible via query database 108 may be searchable based on tags, comments, and/or keywords and search terms. Thus, a query stored in query database 108 may be associated with metadata including an associated tag, comment, and/or keyword. The associated tag, comment and/or keyword may include identifiers relating to the type of data to be accessed, or a department, timeframe, and other identifiers for facilitating retrieval of a relevant query based on user input. A keyword may include text associated with one or more characteristics of the query and/or the data pulled from a database based on the query. In the disclosed embodiments, a tag, comment, and/or keyword may be input and associated with the query by an analyst user, and may be associated with the query at the time the query is included in query database 108 or as an update to a pre-existing and preconfigured query in database 108.

As an example, a query included in query database 108 may be configured to pull quarterly sales data from several structured database tables associated with data repository 110. The analyst who created the query may input the keywords "quarterly" and "sales" into the query database, as well as other parameters, to be stored as metadata for the query. In the disclosed embodiments, a non-analyst user may not know how to structure a query to pull the quarterly sales data or know which database tables to access to pull the quarterly sales data. The disclosed embodiments may enable the non-analyst user to search the query database using the search terms or keywords "quarterly" and "sales" to retrieve one or more structured queries or information concerning those structured queries that are associated with either or both of keywords "quarterly" or "sales". Such information concerning a structured query may be based on other metadata associated with the query such as, a creation date, last update date, original author, purpose of the targeted data, users that have accessed and/or run the query, date last run, etc., or other comments associated with the query that may inform a non-analyst (or analyst user) as to the relevance of the query.

Query database 108 may include one or more memory devices that store information and are accessed and/or managed through query broker 112. By way of example, query database 108 may include Oracle™ databases, Sybase™ databases, or other relational databases or non-relational databases, such as Hadoop sequence files, HBase, or Cassandra. Query database 108 may include computing components (e.g., database management system, database server, etc.) configured to receive and process requests for data stored in memory devices of query database 108 and/or data repository 110 and to provide responses to such requests.

Consistent with the disclosed embodiments, data repository 110 may be configured to store enterprise data, such as, information received, obtained, gathered, collected, generated, or produced by an enterprise in the course of business. In certain embodiments, for instance, components of system 100 may receive or obtain information for storage over network 106. By way of example, data repository 110 may store databases related to source code desired to be analyzed. In other aspects, components of system 100 may store information in data repository 110 without using network 106 (e.g., via a direct connection). In some embodiments, components of system 100 may use information stored in data repository 110 for processes consistent with the disclosed embodiments.

Data repository 110 may include one or more memory devices that store information and are accessed and/or managed through query broker 112. By way of example, query data repository 110 may include one or more Oracle™ databases, Sybase™ databases, or other relational databases or non-relational databases, such as Hadoop sequence files, HBase, or Cassandra. Query database 108 may include computing components (e.g., database management system, database server, etc.) configured to receive and process requests for data stored in memory devices of data repository 110 and to provide data from data repository 110.

Query broker 112 may be communicatively connected to query database 108 and data repository 110 through a direct connection and/or a network (e.g., network 106). Consistent with disclosed embodiments, query broker 112 may communicate between data repositories 110, query database 108, and one or both of analyst device 102 and non-analyst device 104. Query broker 112 may receive input from a user associated with an analyst device 102 or a non-analyst device 104. The received input may be, for example, a search term associated with one or more queries stored in query database 108. Input may be, for example, parameters for a query selected by a user. In other embodiments, input may be a date or time interval (e.g., monthly) at which to execute a selected query. Via the query broker 112, a user may select, configure, and modify a query stored in the query database 108. The query broker 112 may communicate with data repository 110 to execute a query selected by the user and return the data retrieved by the query.

Figure 2:
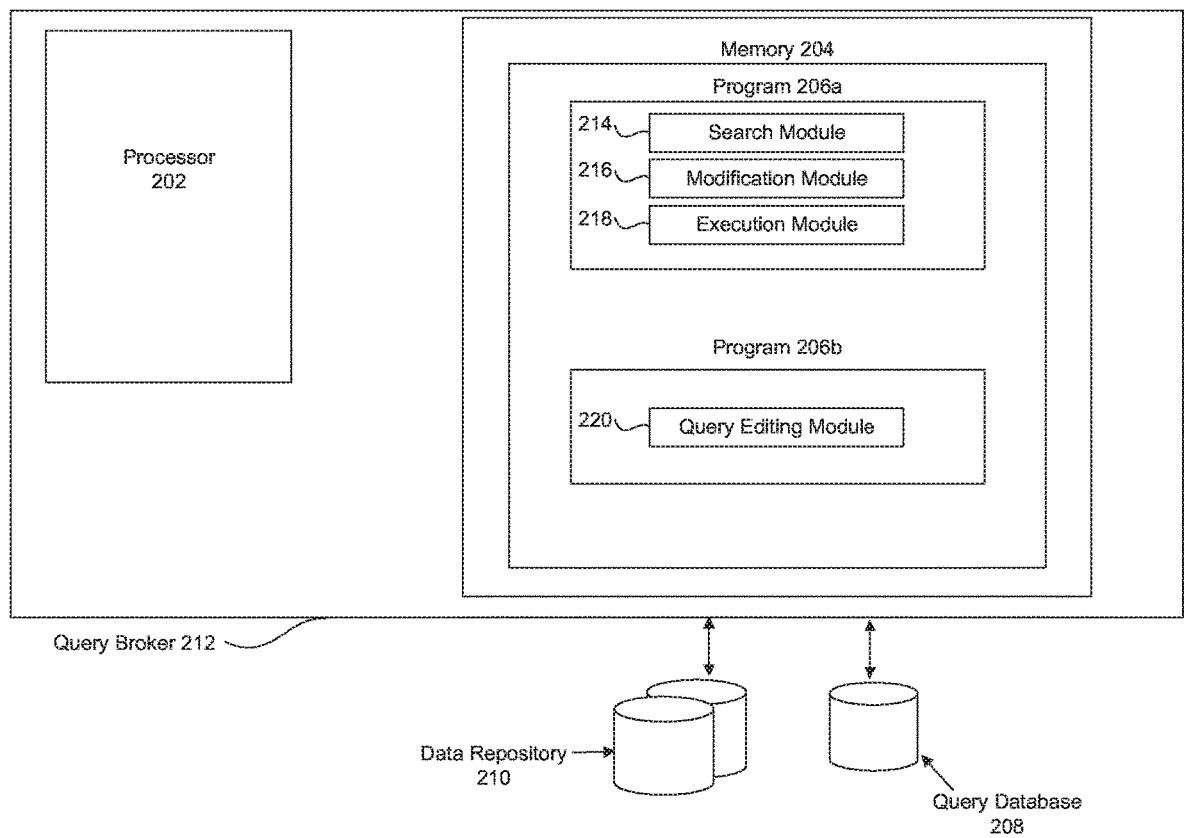
FIG. 2 is a block diagram of an example query broker consistent with disclosed embodiments.

FIG. 2 is a block diagram of an example query broker 212, configured for resolving user inputs into consistent reliable queries for an underlying data platform or data repository 210 based on preconfigured and selectively configurable queries stored in a query database 208. In some embodiments, query broker 212 corresponds to query broker 112, as described with respect to FIG. 1, and likewise, data repository 210 and query database 208 may correspond to data repository 110 and query database 108, respectively, as also described with respect to FIG. 1.

In some embodiments, query broker 212 may include one or more processors 202 and one or more memories 204. Query broker 212 may be standalone, or it may be part of a subsystem, which may be part of a larger system. Query broker 212 may reside on a single server or may be configured to reside on a distributed computer system including multiple servers or computers that interoperate to perform one or more of the processes and functionalities associated with the disclosed embodiments.

Processor 202 may include one or more known processing devices, such as a microprocessor from the Pentium™ or Xeon™ family manufactured by Intel™, the Turion™ family manufactured by AMD™, or any of various processors manufactured by Sun Microsystems, for example. Processor 202 may constitute a single core or multiple core processor that executes parallel processes simultaneously. For example, processor 202 may be a single core processor configured with virtual processing technologies. In certain embodiments, processor 202 may use logical processors to simultaneously execute and control multiple processes. Processor 202 may implement virtual machine technologies, or other known technologies to provide the ability to execute, control, run, manipulate, store, etc. multiple software processes, applications, programs, etc. In another embodiment, processor 202 may include a multiple-core processor arrangement (e.g., dual core, quad core, etc.) configured to provide parallel processing functionalities to allow query broker 212 to execute multiple processes simultaneously. One of ordinary skill in the art would understand that other types of processor arrangements could be implemented that provide for the capabilities disclosed herein. The disclosed embodiments are not limited to any type of processor(s) configured in query broker 212.

Memory 204 may include one or more storage devices configured to store instructions executable by processor 202 to perform functions related to the disclosed embodiments. Memory 204 may be a volatile or non-volatile, magnetic, semiconductor (e.g., EEPROM, flash memory, etc.), tape, optical, removable, non-removable, or other type of storage device or tangible (i.e., non-transitory) computer-readable medium.

In some embodiments, memory 204 may be configured with one or more software instructions, such as one or more program(s) 206a, 206b that, when executed by processor 202, perform the disclosed methods including operations for searching for a structured query in a query database, modifying or configuring a query, and executing a query in a database system. The disclosed embodiments are not limited to separate programs or computers configured to perform dedicated tasks. For example, memory 204 may include one or more of programs 206a, 206b that perform one or more functions of query broker 212. Additionally, processor 202 may execute one or more programs located remotely from query broker 212. For example, a user associated with analyst device 102 or non-analyst device 104 may, via query broker 212 (or variants thereof), access one or more remote programs that, when executed, perform functions related to certain disclosed embodiments. In some embodiments, programs 206a, 206b may be stored in an external storage device, such as a cloud server located outside of query broker 212, and processor 202 may execute programs 206a, 206b remotely. In some embodiments, query broker 212 may be provided as part of a cloud computing environment.

In some embodiments, the memory 204 may store programs 206a, 206b accessible by either analyst devices or non-analyst devices. For example, a user associated with an analyst device may have access to search module 214, modification module 216, and execution module 218.

Search module 214 is configured to receive one or more search terms input by a user, which may be an analyst or non-analyst. A search term may be a keyword, tag, and/or date range, for example, or any other term that may facilitate access to underlying data of data repository 210 according to the disclosed embodiment. Search module 214 includes instructions for communicating with query database 208 to locate one or more queries containing or associated with one or more of the search terms. Search module 214 may also include instructions for displaying a menu or listing of the results to the user via a user interface. In some embodiments, search module 214 may rank and display search results by relevance including by a date created, rating, etc. Relevance may also be determined based on keyword association, or other relevant parameter such as identity of the creator or other association based on an organizational structure of an enterprise (e.g. relevant line of business). Search module 214 may allow a user to input several search parameters. Query broker 212 may also contain a query database dictionary, accessible to search module 214, listing queries by one or more attributes such as output type, tables accessed, and/or date created and other metadata associated with one or more preconfigured queries stored in query database 208.

Search module 214 may be configured to identify relevant queries based on associated plain English descriptions. For example, a structured query for selecting quarterly sales data may use complex joins to pull data from several locations. An untrained non-analyst may not be able to identify what data a query will return based on its structure or the database tables it retrieves information from. Upon query creation in the query database 208, however, an analyst may associate tags, keywords, or descriptions with a query to allow a non-analyst to easily find the preconfigured query based on non-technical language. This technique advantageously enables a non-analyst to find a preconfigured structured query to return desired data without consulting a person of technical skill.

Modification module 216 is configured to allow a non-analyst user to modify or selectively configure a query. Specifically, in some embodiments, modification module 216 identifies selective parameters in a preconfigured, structured query and displays an interface allowing the user to input specifications, updates, or changes to the parameters. The selective parameters may be designated by an analyst and associated with the stored structured queries. Thus, in some embodiments, a non-analyst user may only be able to configure or update particular, predetermined selective parameters of the one or more structured queries in query database 208. Modification module 216 may be configured to receive the parameter specifications or modifications and update or configure an executable query accordingly. For example, a non-analyst user may select a query:

SELECT *
FROM table1
INNER JOIN table 2
ON table1.column_a=table2.column_b
WHERE table1.date_created='2017-12-01 00:00:00';

Modification module 216 may identify one or more selective parameters that may be configurable or changed. For example, in the above query, modification module 216 may display, via a user interface displayed on non-analyst device 104, a field for a non-analyst user to input one or more columns to be displayed from table1 and table2. Modification module 216 may also display a field for entering a date, allowing the user to configure or change the creation date of the data pulled. In this way, modification module 216 allows an untrained, non-analyst user to customize or change a query without detailed knowledge of particulars of the query language.

Execution module 218 may be configured to receive a modified query from the modification module 216 and execute the query by accessing one or more databases stored in the data repository 210. Execution module 218 may run or execute the script or query and return the resulting pulled data via a user interface. In some embodiments, the data may be cleaned or analyzed and output in a chart or in a graphical form, or other configurable or specified report. In other embodiments, the analyst or non-analyst user may choose an output format for the data returned by the script or query, for example, the output format may be an XML, PDF, CSV, Excel™, or JSON file.

Memory 204 may contain a program 206b that may only be accessible to a user associated with an analyst device. In some embodiments, a user associated with an analyst device may access both the non-analyst program 206a and the analyst program 206b. In some embodiments, a user associated with an analyst device may have permissions to access secure databases or one or more database environments that may be inaccessible to non-analyst users, and may be granted permissions for creating, configuring or reconfiguring one or more structured data queries beyond the selective configuring permissions available to a non-analyst.

Query editing module 220 may be configured to allow an analyst user to reconfigure, create, and store queries within the query database 208. Query editing module 220 may receive a query and associated metadata and/or descriptions input by an analyst user to be stored in query database 208. Added queries may be made accessible to non-analyst users via interaction with search module 214. In some embodiments, query editing module 220 may allow users to edit a query script rather than only change selective parameters, as allowed by modification module 216. Further, query editing module 220 may provide analysts quality control over queries stored in query database 208. For example, analysts may remove inconsistent or erroneous queries, thereby ensuring consistent data is pulled by users of system 100. Additionally, analysts may remove poorly performing queries or manage process threading to optimize system speed.

Memory 204 may also store data that may reflect any type of information in any format that query broker 212, or query broker system 100, may use to perform operations consistent with the disclosed embodiments. For example, in some embodiments, memory 204 may store data or other information corresponding user or account permissions. For example, memory 204 may store account information indicating whether or not a user is associated with an analyst device 102 or a non-analyst device 104. Memory 204 may also store instructions to enable processor 202 to execute one or more applications, such as server applications, network communication processes, and any other type of application or software including software for performing operations associated with a financial service account. Alternatively, the instructions, application programs, etc., may be stored in an external storage in communication with query broker 212 via network 106 or any other suitable network.

Figure 3:
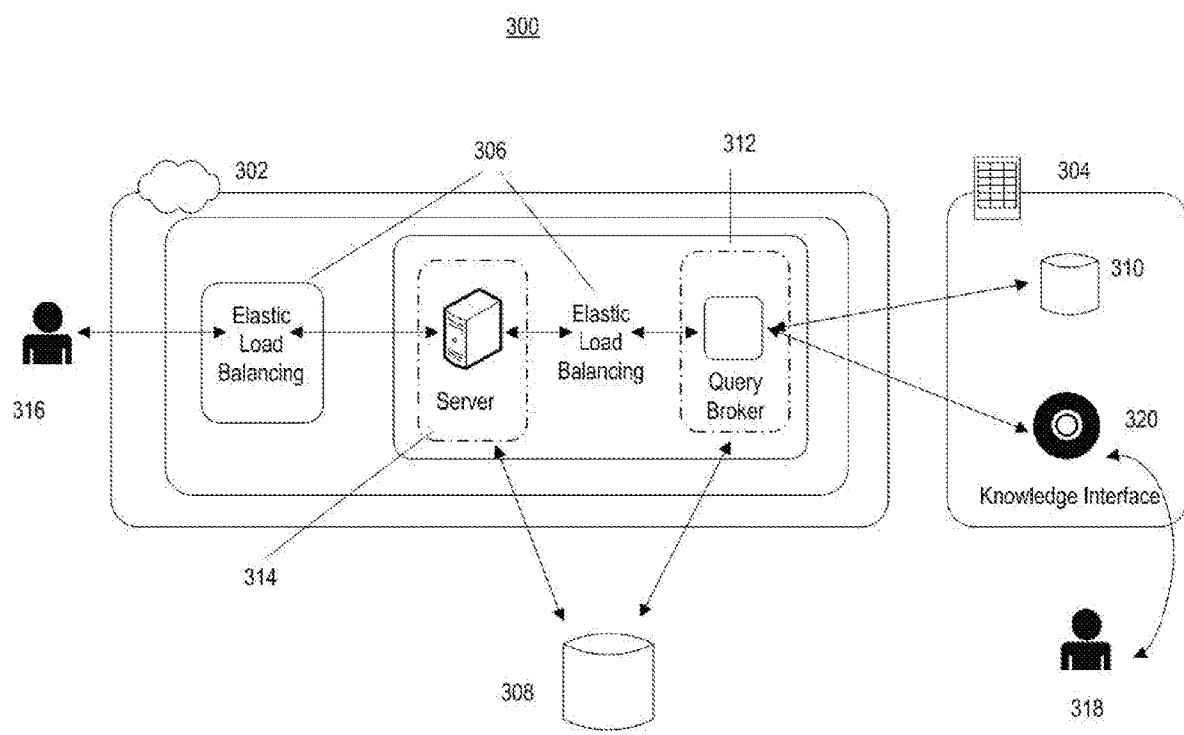
FIG. 3 is an example architecture of a query brokering system configured to perform functions of the disclosed methods, consistent with disclosed embodiments.

FIG. 3 is a diagram of the architecture of an example embodiment configured to perform functions of the disclosed methods, consistent with disclosed embodiments. As shown, query broker system 300 may reside on a cloud-based storage system 302, e.g. Amazon Web Services® or the like. In some embodiments, the query broker system 300 may reside on an on-premise storage system. In some embodiments, query database 308 and data repository 310 may reside on an on-premise storage system 304. In some embodiments, query database 308 and data repository 310 may reside on a cloud-based storage system. Cloud-based storage system 302 may include one or more levels of security, limiting access to various components based on user permissions, such as may be applied to analyst and non-analysts. In some embodiments, cloud-based storage system 302 contains one or more of an elastic load balancing module 306, a server 314, and a query broker 312. Query database 308 and data repository 310 may correspond to those same elements shown and described with respect to FIGS. 1 and 2.

Elastic load balancing module 306 may be configured to manage and distribute requests from users across multiple resources, and allow query broker system 300 to handle multiple user requests simultaneously. Elastic load balancing module 306 may distribute incoming user requests to the appropriate components and output results to one or more users, monitor the health of the upstream components, and report underperforming components to a microservices manager so they may be replaced with healthy components. In some embodiments, the output of components may be analyzed to diagnose an underperforming component.

Server 314 may allow an analyst user 316, particularly someone skilled in database queries and database management, to manage queries in a query database 308 via query broker 312. In some embodiments, server 314 may be a Web application and/or a software application. Managing queries may include activities such as creating a new query, editing the script of a query, and/or deleting a query from the query database 308, as described above. An analyst user 316 may also manage query database 308 itself via server 314. Database management activities may include creating, deleting, or editing tables, managing database processes, and/or inserting or deleting data from data repository 310. For example, an analyst user 316 may create a particular query that does not already exist in query database 308 or reconfigure existing queries. In this example, analyst user 316 may add the created query to the query database 308 and the query may subsequently be made available for modification or selective configuration by a non-analyst user 318 through knowledge interface 320. In some embodiments, an analyst user 316 may associate each created query with a tag and short description of the results returned by the query, as well as other information that may be helpful to resolve a context or relevance of the query.

In some embodiments, the analyst user 316 may modify a previously created query in the query database 308. For example, the analyst user 316 may provide information and/or comments on the modification that may be stored in a changelog associated with the query. In some embodiments, when an analyst user 316 modifies a query, the modified query may be stored in query database 308 as a new version of the same query. A non-analyst user 318 may select a version of a query via knowledge interface 320.

In some embodiments, query broker 312 may communicate through an elastic load balancing module 306 with server 314 to allow an analyst user 316 to access non-analyst user functions. Query broker 312 may correspond to query broker 112 and 212, shown and described with respect to FIGS. 1 and 2. A non-analyst user 318 may access data stored on data repository 310 via a knowledge interface 320. Knowledge interface 320 may include an enterprise portal or other interface through which a non-analyst may access data of data repository 310. Knowledge interface 320 may allow a non-analyst user 318, i.e., a user without technical knowledge of database languages, to access and execute queries stored in query database 308. Consistent with the disclosed embodiments, knowledge interface 320 may allow user 204 to modify a preconfigured structured query at a high level via selective parameters, for example, by allowing a user to change a date range in an existing query or to add a column to be selected from a table by the query. In some embodiments, knowledge interface 320 may allow a non-analyst user 318 to interact with the data repository 310 and the query database 308 by communicating with the query broker 312. In some embodiments, knowledge interface 320 may be displayed in a web browser.

Knowledge interface 320 may present a non-analyst user 318 with a user interface to search for, configure, modify, and run structured queries in plain English, or in a way that is accessible to one who is not skilled in database languages. Knowledge interface 320 may provide interface functionality to search for stored queries stored in query database 308 based on tags or keywords, for example. In some embodiments, knowledge interface 320 may display suggested search terms, such as commonly searched tags or keywords and/or commonly used queries or other queries associated with a user organization within an enterprise etc. Knowledge interface 320 may also display queries in one or more lists categorized by query attributes. For example, a list may contain all queries associated with sales data and another list may contain all queries associated with financial accounts. In another example, knowledge interface 320 may display a list of frequently used queries or of queries frequently used by the user or other persons or colleagues associated with the user or the user's organization.

For example, a non-analyst user 318 may be permitted to search for a query to return quarterly sales by using search terms or keywords such as "quarterly" or "sales data." Knowledge interface 320 may then communicate with query broker 312 to search the query database 308 for queries that pull data associated with sales metrics and that filter the data by quarter. The knowledge interface 320 may next display one or more resulting structured queries or information associated with the structured queries to the non-analyst user 318. Via knowledge interface 320, the non-analyst user may be presented with options of selective fields or parameters that can be modified, as well as other information detailing the relevance of the fields or other information that may facilitate the user to selectively configure a query for pulling targeted data. Knowledge interface 320 may interact with query broker 312 and act as an intermediary interface between the non-analyst user 318 and one or more structured queries configured to access data stored in the data repository 310.

Figure 4:
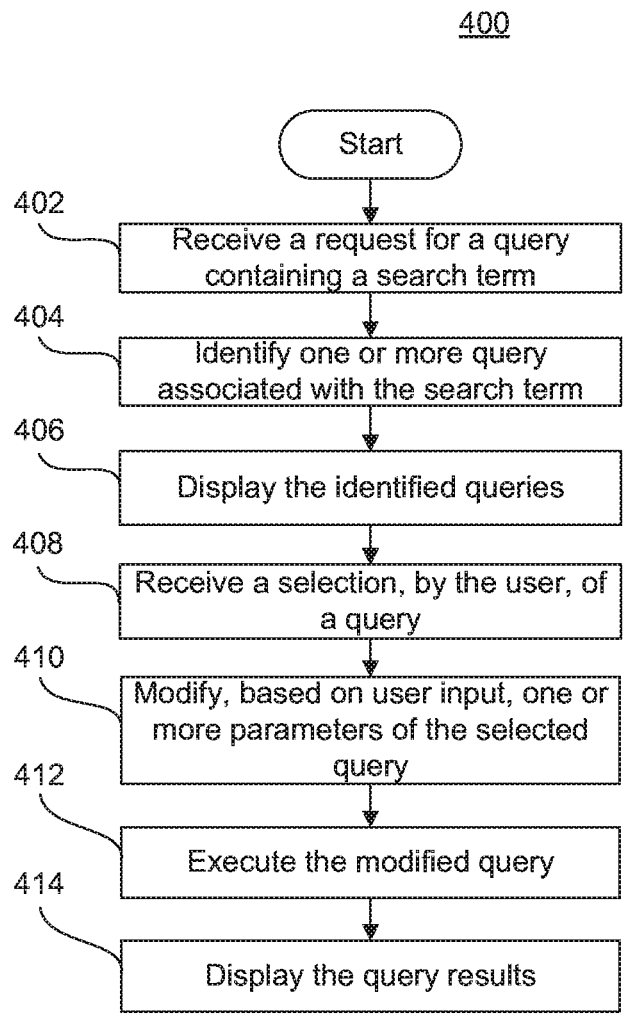
FIG. 4 is a flowchart of an example process, consistent with disclosed embodiments.

FIG. 4 is a flowchart showing an example process 400 through which a non-analyst user may configure and execute a structured query to access data of a database system. At Step 402, a request for a structured query may be received that includes one or more search terms or keywords that may be associated with one or more structured queries of a query database. In some embodiments, the request is received by query broker 312 from a user, via an interface that may be displayed on an analyst or non-analyst device and may be accessible via knowledge interface 320, for example. Search terms may include dates, tables, columns, or tags, or other identifiers associated with targeted data, users, organizations within an enterprise etc. In some embodiments, acceptable search inputs may be free-form, natural language including one or more search terms or other parameters. In this example a user may be either an analyst or non-analyst.

At step 404, query broker 312 may identify one or more structured queries in the query database 308 containing or associated with the search term input by the user. For example, a user may search for "account numbers by state." In this example, the query broker 312 may identify queries in the query database 308 that access tables containing account number data. Queries may also be identified by tags or descriptions such as "closed accounts by month" indicating that the associated query pulls the account numbers that have been closed during a certain month. Queries may also be identified by the time period of data the query pulls. For example, a query accessing account numbers created by month may contain the tag "monthly" or "by month." In another example, tables in the data repository 110 may be associated with tags or descriptions. A non-analyst user may not know the name of the table containing their desired data or a syntax of various parameters. Query broker 312 may return one or more structured queries accessing relevant tables having a tag or description matching or associated with the one or more search terms.

In some embodiments, an analyst user may use query broker system 300 to search for a previously created and preconfigured structured query in the same manner as a non-analyst user. This provides advantages similar advantages to analysts who may often generate the same or similar queries several times over or rely on experiential knowledge of other analysts. The ability for an analyst to search for a preconfigured structured query may facilitate the analyst to identify relevant preconfigured queries and increase efficiency by removing the need to repeatedly generate or regenerate substantially similar queries. When the same data is requested by a non-analyst or analyst, the example embodiments enable consistent or identical queries to be executed to provide consistent data results. In some embodiments, frequently requested query results may be cached to improve speed. Furthermore, in some embodiment frequently requested queries may be categorized or provided via an interface to facilitate their selection without a user having to input a search term or keyword.

At step 406, query broker system 300 displays, via knowledge interface 320, for example, the one or more structured queries identified as containing relevant keywords, descriptions, or information associated with the search term or terms input by the user. The display may include a menu or list of the identified queries that may be selected based on input by the user. In some embodiments, the identified queries may be displayed in order of relevance, by date, or by user rating. A user rating for a query may be input by an analyst or non-analyst user via knowledge interface 320 indicating the efficacy of the query. In some embodiments, a user may also comment on a query. Rating factors may include query performance, quality of data pulled, and/or accuracy of the associated tags or description. In some embodiments, knowledge interface 320 may display a user history associated with the query and/or the most recent date the query was run. In some embodiments, knowledge interface 320 may display a description of an identified query and an explanation of the data returned by the query. In some embodiments, the description and explanation may be input by an analyst user via server 314. In some embodiments, the description and explanation may be provided in such a way that a non-analyst user is able to understand the query and the results without technical knowledge of a query language or database system.

At step 408, query broker system 300 may receive input from a user, e.g. via knowledge interface 320, indicating selection of the user's desired query. In some embodiments, a user may input a new request or further search among the returned results. Upon selection of a preconfigured query from the identified queries, knowledge interface 320 may display additional information about the query. For example, knowledge interface 320 may display the query's creator, creation date, tags, description, rating, previous uses, preview data set, and full query script. Other additional information may include identification of one or more selectively configurable parameters of the preconfigured query.

At step 410, query broker system 300 may receive input from a user, e.g., via the knowledge interface 320, to modify or configure one or more of the selectively configurable parameters of the selected query. For example, the interface may display input fields that accept text, numbers, or dates or other inputs that can be resolved into text numbers or dates. Thus, in some embodiments, a user may change or configure the date range of the data pulled by the query via the knowledge interface 320. In some embodiments, knowledge interface 320 may also display a checklist of possible columns of a particular table to access using the identified query. In some embodiments, a user may not wish to pull all the columns of a table or may wish to include more data than the selected query pulls and therefore may be provided with functionality that enables selection of which columns of data to pull. Optionally, the user may choose to execute the selected preconfigured query as is, without any modification or further configuration.

At step 412, query broker 312 may communicate with the relevant database in data repository 310 to execute a structured query based on the user selection or configuration entered via knowledge interface 320.

At step 414, knowledge interface 320 may display query results returned by the query broker 312. In some embodiments, query broker system 300 may be configured to execute queries and to output the results in an appropriate form for a report, such as a table with columns specified by the user, for example. In other embodiments, query broker system 300 may be configured to output the resulting data as a chart or graph with parameters set by the user. A user may be able to select or modify a form of the desired output via knowledge interface 320. In some embodiments, query broker system 300 may be configured to be scheduled by the user to run specified queries at defined intervals, such as daily, weekly, or monthly, or upon certain triggered events, such as an update to a database. In some embodiments, when queries are executed or scheduled by analyst and/or non-analyst users, they are pushed to a queue from which a job scheduling module creates the required number of processors to execute the queries.

Figure 5:
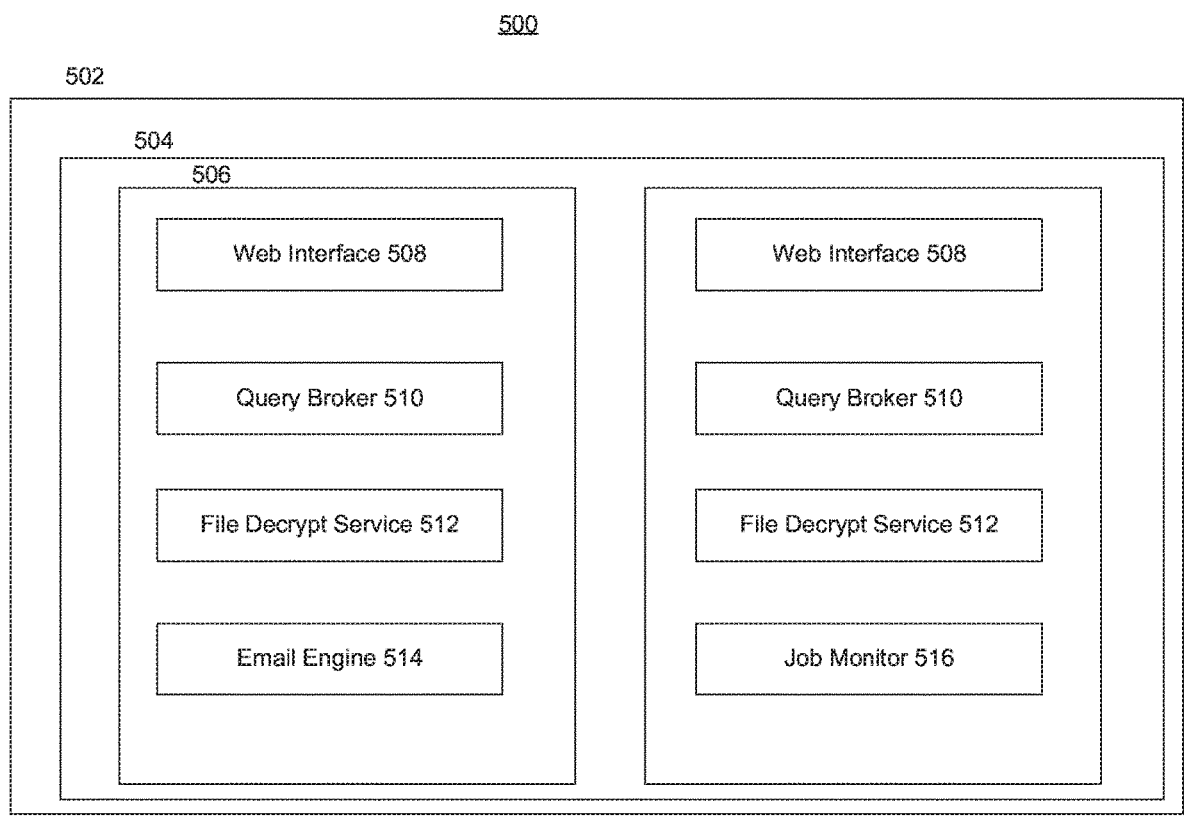
FIG. 5 is a block diagram of an example microservices based architecture, consistent with disclosed embodiments.

FIG. 5 is an example embodiment of a query broker system 500 implemented in a virtual containerized environment. In some embodiments, query broker system 500 may be scaled up to allow numerous different applications to access an example query broker by employing a containerized environment. In some embodiments, query broker system 500 may be hosted on a web server system 502, for example, such as provided by Amazon Web Services®. In some embodiments, query broker system 500 may be accessible by several users and applications within an enterprise, for example, allowing users to access an example query broker, or components of the query broker, simultaneously via different paths.

Query broker system 500 may communicate with a microservice manager that allows application developers to produce independently deployable applications while other users are accessing and using the query broker system 500. In some embodiments, query broker system 500 may be used and accessed by an application. For example, a user may communicate indirectly with the query broker via an application interface.

Each component (e.g., query broker 510, decryption service 512, email engine 514, job monitor 516, etc.) of the query broker system 500 may be created as individual components instead of a single monolithic application. Each component may be deployed in a separate container with the help of a microservices manager (like AWS EC2 Container Service) which orchestrates the deployments of the components. The responsibilities of the microservices manager may include, for example, monitoring the health of the deployed components, replacing unhealthy components with new healthy components, maintaining a specified number of healthy components in the system to handle user requests, and/or deploying updates to various components of the system without affecting users who are currently accessing the system.

Web server 502 may contain a secure cluster 504. In some embodiments, secure cluster 504 may ensure that sensitive data accessible via web server 502 cannot be accessed by users without authorization. For example, access to query broker system 500 may require permissions or may include various levels of security to limit access to authorized users, which may be enforceable for objects within secure cluster 504. Within the secure cluster 504, protected programs, applications, or functions may be stored in containers 506. Containers 506 allow access to the query broker system 500 from multiple access points at once. For example, a user and an application accessing the disclosed query broker system may be able to access necessary functions and data simultaneously. In some embodiments, a containerized system allows the query broker system components to stand independently and allows each component to be accessible to either a user or application. A container 506 may enable several processes or applications to be run simultaneously and separately on web server 502. For example, one container may host a web interface 508, a query broker 510, a file decryption service 512, and an email engine 514 and another container may host a web interface 508, a query broker 510, a file decryption service 512, and a job monitor 516.

Additionally, containers 506 may provide consistent environments for the components of the system to run meaning the environment in which the component is developed is identical to the environment in which the component will run in production. Containers may also bring more modularity to the overall system architecture as complex applications are split into smaller and more easily manageable microservices.

Web interface 508 may be associated with web server 314, as shown and described in FIG. 3. Query broker 510 may correspond to query broker 112, 212, and 312, as shown and described above with respect to FIGS. 1-3.

In some embodiments, file decryption service 512 may allow data to be input and output securely within query broker system 500, and notification engine 514 may generate reporting emails and/or notifications based on scheduled queries or based on system metrics such as usage and processing load. Notification engine 514 may alert both analyst and non-analyst users to the status of an executed query and, for example, whether or not it has stalled, finished running, and/or been paused. Job monitor 516 may allow a user to monitor the execution of a query for performance via an interface such as web interface 508 or knowledge interface 320, as shown in FIG. 3. A job may be a query or queries to be executed. Notification engine 514 and job monitor 516 may output query or job status data in natural language or in a form that may be understood by a non-analyst user. In addition, notification engine 514 may automatically generate an email or other notification to the user generating the job that the job needs attention by either an analyst or non-analyst user.

Figure 6:
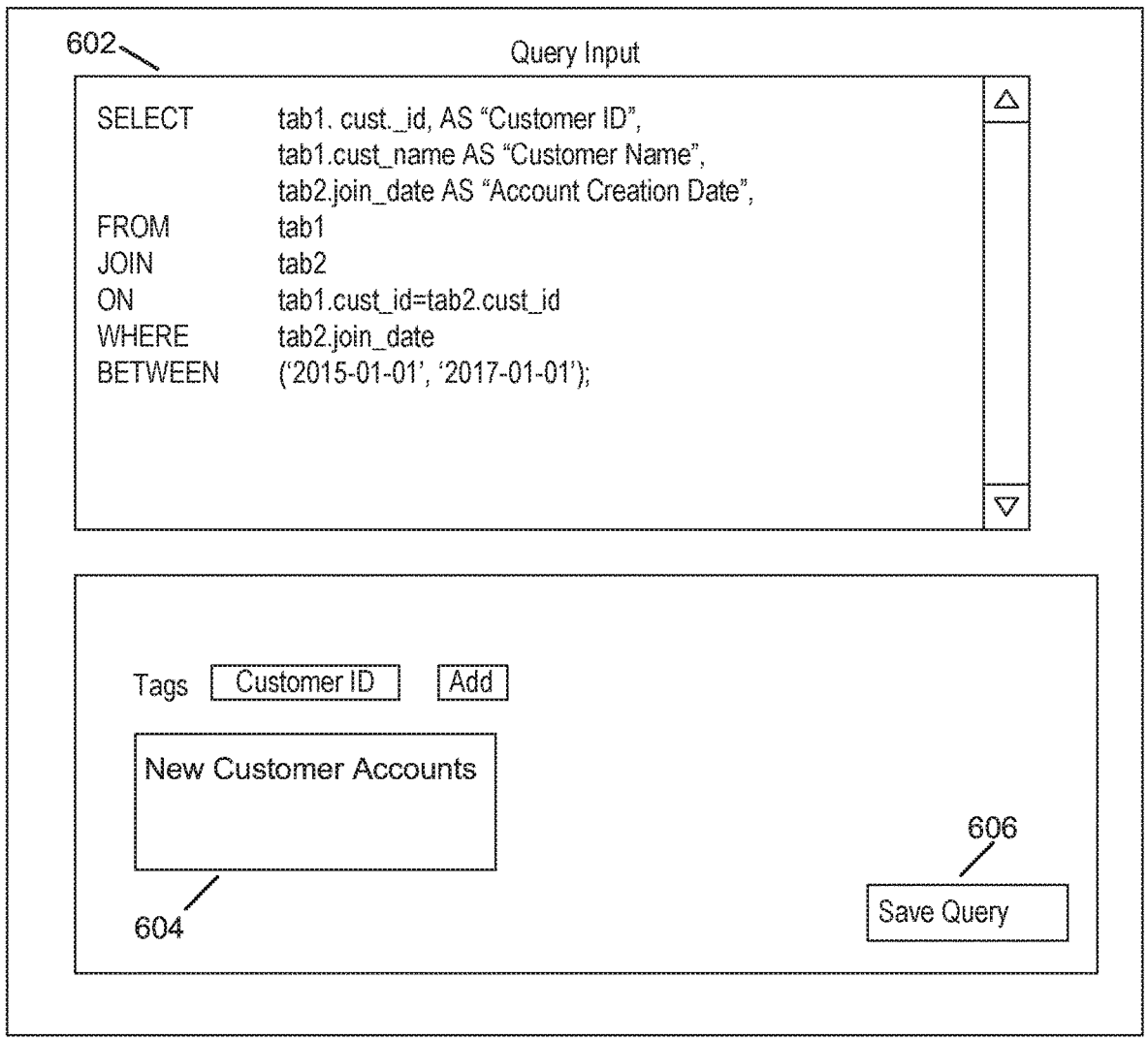
FIG. 6 is an example query input interface, consistent with disclosed embodiments.

FIG. 6 is an example query input interface 600 that may be displayed to an analyst user on an analyst device 102 according to some embodiments. Query input interface 600 may allow an analyst user to create and store queries in the query database 108, for example. Query interface 600 may also include a query window or region, such as text box 602 that accepts a query in a database language input by the analyst user. When entering a query, an analyst user may input aliases or other indicia so one or more parameters or other information that may be displayed to a non-analyst user is easily understandable to the non-analyst user. For example, instead of displaying tab1.cust_name, the column as identified by the database, a straight forward alias to the column, such as "Customer Name" may be associated with the column. In this way, a non-analyst user need not have detailed knowledge of the tables in a database or a syntax of the database to be able to identify a relevant query for accessing data stored in a database system.

Query input interface 600 may also include a tag input window or region 604. Using the tag input window 604, an analyst user may input or assign text associated with the configured, structure query that will be easily understandable and searchable by a non-analyst user. For example, an analyst user may add terms or keywords to a listing of tags to be associated with the structured query. A tag may be a column name, such as "Customer ID" or may give an overview of the data returned by the query, such as "New Customer Accounts." Tags may also indicate other query attributes not listed. In some embodiments, tag input window 604 may include suggestions of frequently used tags or tags frequently used in queries accessing the same tables. After an analyst user has input and configured a structured query and identified relevant tags, the system will analyze the query to validate syntax errors in the query, identify the columns used in the query to warn the users about consuming sensitive information and may also identify potential performance bottlenecks. The analyst user may press a "Save Query" button 606 to save the query and query metadata, including associated tags, in the query database 108. Once a query is saved in query database 108, it may be edited or deleted at a later date by an analyst user.

Figure 7:
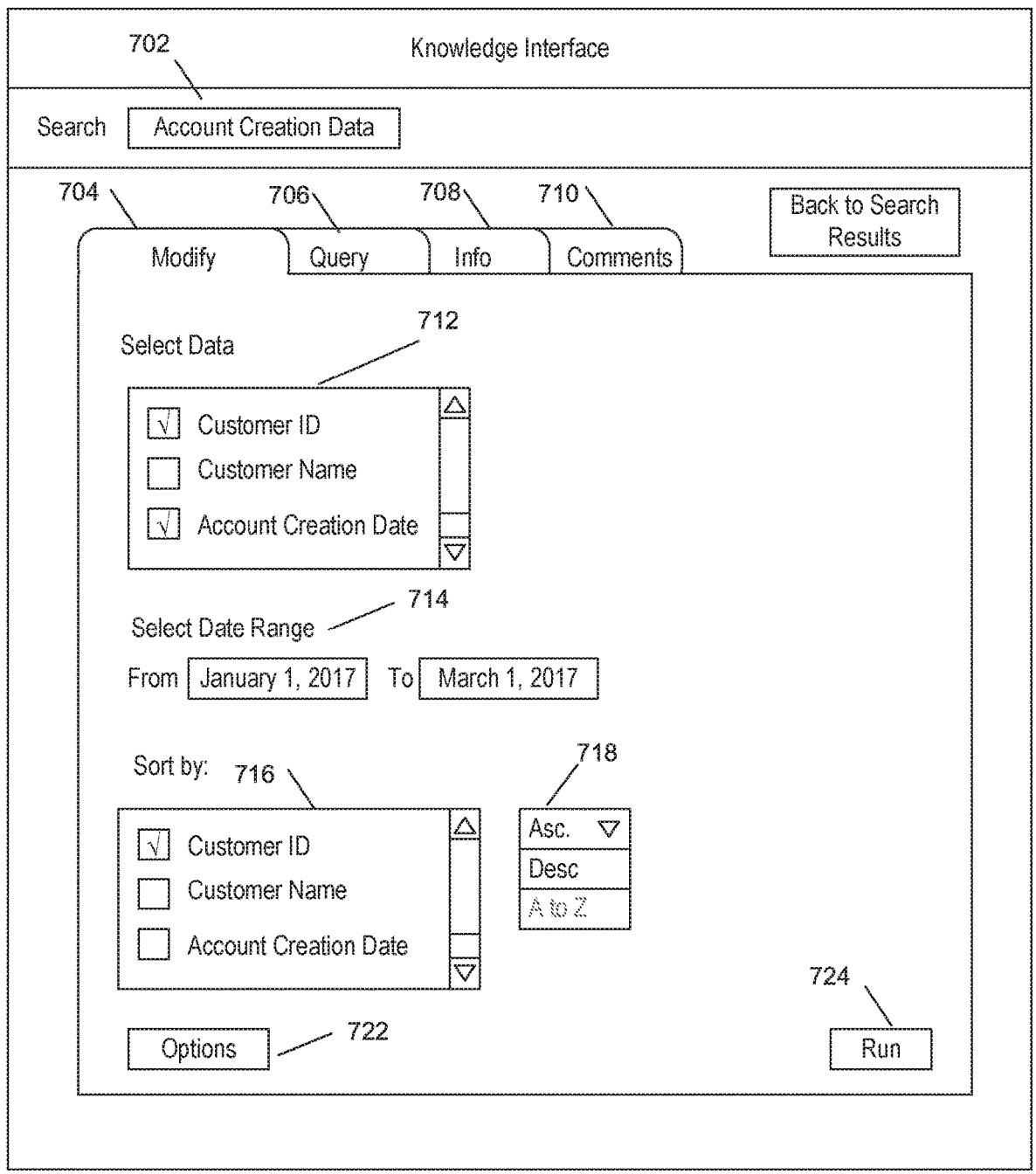
FIG. 7 is an example knowledge interface, consistent with disclosed embodiments.

FIG. 7 is an example knowledge interface 720 according to some embodiments. Knowledge interface 720 may be the same as knowledge interface 320, as shown and described with respect to FIG. 3. Knowledge interface 720 may allow a non-analyst user to search for, selectively configure, modify, and run a query, such as the query described with respect to FIG. 6.

To search for a query, a non-analyst user may input a search term into an input window, such as search field 702. The search term may be a text or numerical value. In some embodiments, search module 214 (as described with respect to FIG. 2), for example, may execute the search. A search may run on query database 108 and return one or more preconfigured queries having tags, keywords, scripts, and/or comments matching or associated with the search term input by the non-analyst user. The search results may be displayed to a non-analyst user as a list from which the non-analyst user may sort and select an identified query. In some embodiments, the identified preconfigured query may be selectively configurable, and thus knowledge interface may provide one or more additional input windows that allow further configuration or modification of an identified query.

Once a query has been selected by the non-analyst user, knowledge interface 720 may display an interface with selectable tabs including, for example, a modify tab 704, a query tab 706, an info tab 708, and a comments tab 710.

When the modify tab 704 is selected by the non-analyst user, the interface may display a data selection window 712 that allows the non-analyst user to select which data to include in the query. The data selection window may display one or more column aliases input by the analyst user (as described above). For example, an identified structured query may be preconfigured to pull data from multiple columns of a database table. Using the interface displayed by the modify tab 704, a non-analyst user may be allowed to select any combination of one or more available columns to include in the query. If the target data is to include a data range, and a date range of the identified query is selectively configurable, the non-analyst user may be prompted to enter a date value in an input window, such as date range field 714. In some embodiments, query broker 112 may identify a where clause of the preconfigured query and prompt the non-analyst user to specify parameters associated with the where clause. For example, if a query includes "WHERE tab1.index1=tab2.index2", modify tab 704 may display a window region or other feature prompting the non-analyst user to enter a numerical index value that the user desires to access.

Additionally, in some embodiments, modify tab 704 may include functionality to sort the data returned by the query. Sort functionality may be provided via a selectable input such as input window 716, which may display available columns of a database table that may be selectable by the non-analyst user. An additional interface features, such as sorting feature 718, may allow a user to sort one or more of the selectively configurable modification options. In some embodiments, sorting options that are not applicable to the data type of a column may not be selectable. For example, if the non-analyst user selects a numerical field such as "Customer ID" the user may select to sort the data in numerically ascending or descending order, but may not be allowed to select to sort the data alphabetically since Customer ID is not a string. In some embodiments, a non-analyst user may only be able to sort by columns selected in the data selection window 712.

Knowledge interface 720 may also include an options button 722 that may allow a non-analyst user to execute additional functionality associated with the execution of a selected query. For example, a non-analyst user may be able to save the modified query as a frequently used query. In other examples, a non-analyst user may be able to schedule the query to begin execution at a specific time. In other examples, a non-analyst user may be able to configure the system to generate an email or other notification (e.g., Tweet™, SMS message, etc.) to one or more recipients containing the selected data when the query has run.

In some embodiments, when the non-analyst user is finished modifying a query, the user may press a "Run" button 724 to execute the selectively configured structured query. When the query is executed, the selectively configured query may be communicated to query broker 112, 212, 312, etc. In some embodiments, modification module 216 may resolve the input from knowledge interface 720 with the original query. For example, the query generated by the modification module 216 from the above example may be:

SELECT tab1.cust_id AS "Customer ID",
//tab1.cust_name AS "Customer Name",//
tab2.join_date AS "Account Creation Date"
FROM tab1
JOIN tab2
ON tab1.cust_id=tab2.cust_id
WHERE tab2.join_date
BETWEEN ('2017-01-01', 2017-03-01)
ORDER BY tab1.cust_id ASC;

In this example, the non-analyst user did not select "Customer Name" as a field to select from the database. The original query may be modified to comment out the unselected fields. In some embodiments, the unselected fields may be deleted and not appear in the modified query. The modification module 216 may also be configured to modify the original query by inserting the input date range into the WHERE clause of the original query. Additionally, since the non-analyst user selected to sort the data based on Customer ID, the modification module 216 may add an ORDER BY clause.

The modified query may then be run by execution module 216. The modified query may or may not be saved in the query database 108. In some embodiments, only analyst users have permissions to edit or add queries in the query database 108. In some embodiments, the modified query may be stored or logged and associated with the non-analyst user and other metadata, for example. In some embodiments, information from which the modified query can be determined may also be stored in lieu of the modified query itself. The results of running the modified query may be displayed via the knowledge interface 720, saved to a file in a format chosen by the non-analyst user, and/or saved to a file and sent via e-mail to the non-analyst user and/or one or more recipients chosen by the non-analyst user.

Knowledge interface 720 may also include a query tab 706 that may display the original query as it appears in the query database 108. Knowledge interface 720 may also display an info tab 708. The info tab 708 may display query metadata including the query creator, creation date, user history, most recent run date, associated tags, average run time, and/or a description and explanation of the query and the query results etc. Knowledge interface 720 may also include a comments tab 710 that allows an analyst or non-analyst user to submit comments on a query or rate a query on a scale. Comments tab 710 may also display a listing of all comments and/or ratings associated with the query. Information input via knowledge interface 720 may be forwarded to query broker 212 and associated with the respective structured query. Such information may be used to further determine a rating or relevance of a query with respect to a subsequent query request.

Descriptions of the disclosed embodiments are not exhaustive and are not limited to the precise forms or embodiments disclosed. Modifications and adaptations of the embodiments will be apparent from consideration of the specification and practice of the disclosed embodiments. For example, the described implementations include hardware, firmware, and software, but systems and techniques consistent with the present disclosure may be implemented as hardware alone. Additionally, the disclosed embodiments are not limited to the examples discussed herein.

Computer programs based on the written description and methods of this specification are within the skill of a software developer. The various programs or program modules may be created using a variety of programming techniques. For example, program sections or program modules may be designed in or by means of Java, C, C++, assembly language, or any such programming languages. One or more of such software sections or modules may be integrated into a computer system, non-transitory computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application; such examples are to be construed as non-exclusive. Further, the steps of the disclosed methods may be modified in any manner, including by reordering steps or inserting or deleting steps. It is intended, therefore, that the specification and examples be considered as example only, with the true scope and spirit being indicated by the following claims and their full scope of equivalents.

What is claimed is:

1. A system for resolving user inputs to query an underlying data platform, comprising:
   memory storing instructions; and
   one or more processors configured to execute the instructions to:
      receive, via a user interface from a user device associated with a user, natural language user input related to querying a structured database system, the natural language user input including non-structured search terms;
      identify, in a database storing a plurality of structured data queries and based on metadata identifiers relating the natural language user input with the structured data query, a structured data query associated with the natural language user;
      determine, based on the natural language user input, a set of selective parameters associated with the identified structured data query, wherein the set of selective parameters includes at least one parameter comprising at least one of a table name, a column name, a logical operator, or a column value of the structured data query;
      obtain a set of permissions associated with the user;
      in response to determining that the set of permissions associated with the user is a first set of permissions, modify the set of selective parameters based on the first set of permissions and generate for display, via the user interface, an input field comprising text of the structured data query with the modified set of selective parameters, wherein the user is enabled to modify the text of the structured data query;
      in response to determining that the set of permissions associated with the user is a second set of permissions that is more restrictive than different from the first set of permissions, modify the set of selective parameters based on the second set of permissions and generate for display, via the user interface, a corresponding input field for each selective parameter of the set of selective parameters, wherein each input field enables the user to select and deselect one or more selective parameter of the set of selective parameters;

receive, via the user interface, configuration information for configuring the one or more selective parameters;

configure an executable data query by configuring the one or more selective parameters for the identified structured data query based on the received configuration information;

execute the executable data query based on the configured one or more selective parameters; and provide, via the user interface, data returned from the structured database system responsive to the execution of the executable data query.

2. The system of claim 1, wherein the one or more processors are further configured to execute the instructions to return information associated with the identified structured data query, including one or more of an estimated run time, an average run time, user comments, an aggregate user rating, or links to related queries.

3. The system of claim 1, wherein the one or more processors are further configured to execute the instructions to:

store the executable data query in the database.

4. The system of claim 1, wherein the one or more processors are further configured to execute the instructions to:

receive, via the user interface from the user, comments on the identified structured data query.

5. The system of claim 1, wherein the one or more processors are further configured to execute the instructions to:

analyze the data returned from the structured database system;

generate a visual representation of the analyzed data; and display, via the user interface, the visual representation of the data.

6. The system of claim 1, wherein the one or more processors are further configured to execute the instructions to:

receive, via the user interface, a specified time to run the executable data query.

7. A method for resolving user inputs to queries to an underlying data platform, comprising:

receiving, via a user interface from a user device associated with a user, natural language user input related to querying a structured database system, the natural language user input including non-structured search terms;

identifying, in a database storing a plurality of structured data queries and based on metadata identifiers relating the natural language user input with the structured data query, a structured data query associated with the natural language user input;

determining, based on the natural language user input, a set of selective parameters associated with the identified structured data query, wherein the set of selective parameters includes at least one parameter comprising at least one of a table name, a column name, a logical operator, or a column value of the structured data query;

obtaining a set of permissions associated with the user;

in response to determining that the set of permissions associated with the user is a first set of permissions, modifying the set of selective parameters based on the first set of permissions and generating for display, via the user interface, an input field comprising text of the structured data query with the modified set of selective parameters, wherein the user is enabled to modify the text of the structured data query;

in response to determining that the set of permissions associated with the user is a second set of permissions that is more restrictive than the first set of permissions, modifying the set of selective parameters based on the second set of permissions and generating for display, via the user interface, a corresponding input field for each selective parameter of the set of selective parameters, wherein each input field enables the user to select and deselect one or more selective parameter of the set of selective parameters;

receiving, via the user interface, configuration information for configuring the one or more selective parameters;

configuring an executable data query by configuring the one or more selective parameters for the identified structured data query based on the received configuration information;

executing the executable data query based on the configured one or more selective parameters; and providing, via the user interface, data returned from the structured database system responsive to the execution of the executable data query.

8. The method of claim 7, further comprising returning information associated with the identified structured data query including one or more of an estimated run time, an average run time, user comments, an aggregate user rating, or links to related queries.

9. The method of claim 7, further comprising:

storing the executable data query in the database.

10. The method of claim 7, further comprising:

receiving, via the user interface from the user, comments on the identified structured data query.

11. The method of claim 7, further comprising:

analyzing, by a processor, the data returned from the structured database system;

generating a visual representation of the analyzed data; and displaying, via the user interface, the visual representation of the data.

12. The method of claim 7, further comprising:

receiving, via the user interface, a specified time to run the executable data query.

13. The method of claim 7, wherein the set of selective parameters of the identified structured data query comprises a greater number of configurable parameters when the set of permissions associated with the user is the second set of permissions relative to a number of configurable parameters the set of selective parameters when the set of permissions is the first set of permissions.

14. A non-transitory computer-readable media comprising instructions that, when executed by one or more processors, cause operations comprising:

receiving, via a user interface from a user device associated with a user, natural language user input related to querying a structured database system, the natural language user input including non-structured search terms;

identifying, in a database storing a plurality of structured data queries and based on metadata identifiers relating the natural language user input with the structured data query, a structured data query associated with the natural language user input;

determining, based on the natural language user input, a set of selective parameters associated with the identified structured data query, wherein the set of selective parameters includes at least one parameter comprising at least one of a table name, a column name, a logical operator, or a column value of the structured data query;

obtaining a set of permissions associated with the user;

in response to determining that the set of permissions associated with the user is a first set of permissions, modifying the set of selective parameters based on the first set of permissions and generating for display, via the user interface, an input field comprising text of the structured data query with the modified set of selective parameters, wherein the user is enabled to modify the text of the structured data query;

in response to determining that the set of permissions associated with the user is a second set of permissions more restrictive than the first set of permissions, modifying the set of selective parameters based on the second set of permissions and generating for display, via the user interface, a corresponding input field for each selective parameter of the set of selective parameters, wherein each input field enables the user to select and deselect one or more selective parameter of the set of selective parameters;

receiving, via the user interface, configuration information for configuring the one or more selective parameters;

configuring an executable data query by configuring the one or more selective parameters for the identified structured data query based on the received configuration information;

executing the executable data query based on the configured one or more selective parameters; and providing, via the user interface, data returned from the structured database system responsive to the execution of the executable data query.

15. The media of claim 14, the operations further comprising:
returning information associated with the identified structured data query including one or more of an estimated run time, an average run time, user comments, an aggregate user rating, or links to related queries.

16. The media of claim 14, the operations further comprising:
storing the executable data query in the database.

17. The media of claim 14, the operations further comprising:
receiving, via the user interface from the user, comments on the identified structured data query.

18. The media of claim 14, the operations further comprising:
analyzing the data returned from the structured database system;
generating a visual representation of the analyzed data; and
displaying, via the user interface, the visual representation of the data.

19. The media of claim 14, the operations further comprising:
receiving, via the user interface, a specified time to run the executable data query.

20. The media of claim 14, wherein the set of selective parameters of the identified structured data query comprises a greater number of configurable parameters when the set of permissions associated with the user is the second set of permissions relative to a number of configurable parameters the set of selective parameters when the set of permissions is the first set of permissions.

* * * * *